US012617096B2

(12) United States Patent
    Lai et al.

(10) Patent No.: US 12,617,096 B2
(45) Date of Patent: May 5, 2026

(54) COORDINATION OF MULTIPLE ROBOTS USING GRAPH NEURAL NETWORKS

(71) Applicant: GDM Holding LLC, Mountain View, CA (US)

(72) Inventors: Matthew Lai, London (GB); Jonathan Karl Scholz, London (GB); Jose Enrique Chen, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 18/695,751

(22) PCT Filed: Sep. 15, 2022

(86) PCT No.: PCT/EP2022/075656
    § 371 (c)(1),
    (2) Date: Mar. 26, 2024

(87) PCT Pub. No.: WO2023/057185
    PCT Pub. Date: Apr. 13, 2023

(65) Prior Publication Data
    US 2025/0128419 A1     Apr. 24, 2025

Related U.S. Application Data

(60) Provisional application No. 63/252,799, filed on Oct. 6, 2021.

(51) Int. Cl.
    B25J 9/16          (2006.01)
(52) U.S. Cl.
    CPC ............. B25J 9/1682 (2013.01); B25J 9/161 (2013.01); B25J 9/1666 (2013.01)

(58) Field of Classification Search
    None
    See application file for complete search history.

(56) References Cited

U.S. PATENT DOCUMENTS

| | | | |
|---|---|---|---|
| 10,217,074 B1 * | 2/2019 | Stallman | .............. B65G 1/1378 |
| 2020/0143239 A1 | 5/2020 | Simonyan et al. | |

(Continued)

FOREIGN PATENT DOCUMENTS

| | | |
|---|---|---|
| WO | WO 2021152515 | 8/2021 |

OTHER PUBLICATIONS

International Preliminary Report on Patentability in International Appln. No. PCT/EP2022/075656, dated Apr. 18, 2024, 13 pages.

(Continued)

*Primary Examiner* — Arslan Azhar
(74) *Attorney, Agent, or Firm* — Fish & Richardson P.C.

(57)                ABSTRACT

Methods, systems, and apparatus, including computer programs encoded on computer storage media, for controlling a plurality of robots. One of the methods includes: obtaining state data representing a current state of the environment; generating, from the state data, graph data representing a graph of the current state of the environment; processing the graph data using a graph neural network to generate a graph output that comprises a respective updated feature representation for each of the robot nodes in the graph; and selecting, based on the graph output, a respective action to be performed by each of the robots.

18 Claims, 8 Drawing Sheets

(56) References Cited

U.S. PATENT DOCUMENTS

| | | |
|---|---|---|
| 2020/0398428 A1 | 12/2020 | Murray et al. |
| 2021/0192358 A1 | 6/2021 | Song et al. |
| 2022/0143836 A1* | 5/2022 | Yokota .................. B25J 9/1666 |
| 2022/0197288 A1* | 6/2022 | Zhao ................... G05D 1/0212 |

OTHER PUBLICATIONS

International Search Report and Written Opinion in International Appln. No. PCT/EP2022/075656, dated Jan. 18, 2023, 19 pages.
Khan et al., "Graph neural networks for motion planning," CoRR, Jun. 11, 2020, arXiv:2006.06248v1, 12 pages.
Kocsis et al., "Bandit based monte-carlo planning," European Conference on Machine-Learning, 2006, pp. 282-293.
Li et al., "Graph neural networks for decentralized multi-robot path planning," 2020 IEEE/RSJ International Conference on Intelligent Robots and Systems, Oct. 24, 2020, pp. 11785-11792.
Silver et al., "Mastering the game of go without human knowledge," Nature, Oct. 19, 2017, 550:354-359.
Zhou et al., "Graph neural networks: A Review of methods and applications," AI Open, Apr. 8, 2021, 1:57-81.
Office Action in Japanese Appln. No. 2024-521012, mailed on Apr. 22, 2025, 5 pages (with English translation).
Notice of Allowance in Japanese Appln. No. 2024-521012, mailed on Aug. 5, 2025, 5 pages (with English translation).
Office Action in Korean Appln. No. 10-2024-7010268, mailed on Feb. 9, 2026, 38 pages (with English translation).
Qingbiao et al., "Graph Neural Networks for Decentralized Multi-Robot Path Planning," CoRR, submitted on Jul. 14, 2020, arXiv: 1912.06095v2, 8 pages.

* cited by examiner

600

Obtain current state data

610

Perform look ahead iteration to reach a leaf state

620

Generate graph feature representation of the leaf state

630

Process the graph feature representation using the GNN to generate updated feature representation

640

Update planning data according to the updated feature representation

650

For each planning iteration

Select robot actions according to the planning data

COORDINATION OF MULTIPLE ROBOTS USING GRAPH NEURAL NETWORKS

CROSS-REFERENCE TO RELATED APPLICATIONS

This application is a U.S. National Stage application under 35 U.S.C. § 371 and claims the benefit of priority to International Application No. PCT/EP2022/075656, having an International filing date of Sep. 15, 2022, which claims benefit of priority to U.S. Provisional Patent Application No. 63/252,799, filed on Oct. 6, 2021, the disclosure of which is hereby incorporated by reference in its entirety.

BACKGROUND

This specification relates to robotics, and more particularly to planning robotic movements of a plurality of robots.

Robotics planning refers to scheduling the physical movements of robots in order to perform tasks. Certain applications require the coordination of multiple robots in a complex environment. For example, in industrial applications, multiple robot arms can simultaneously operate in a complex workspace to maximize production throughput. Each of the multiple robot arms can be controlled to move along a respective motion trajectory in order to reach one of multiple specified target locations and perform an operation. Coordination of the motion paths and schedules of the multiple robot arms is critical so as to accomplish the operational tasks in an optimal time frame without the multiple robot arms colliding with each other or colliding with obstacle objects in the work environment.

SUMMARY

This specification describes technologies that relate to using graph neural network (GNN) processing to coordinate the actions of a plurality of robots in an environment.

In one innovative aspect, there is described a method for planning the actions to be performed by a plurality of robots in an environment using a graph neural network. A computing system can repeatedly perform the method to generate actions to be performed by each of the robots at each of multiple time steps. The generated robot actions can be communicated to the robots to control their operations in the environment at each time step. The goal for generating the robot actions includes controlling the robots to accomplish specified tasks in an optimal time frame without the robots colliding with each other or colliding with other objects in the environment. As an example, the specified tasks can include moving each of the robots to a respective one of a plurality of target locations. As another example, the specified task can include moving one or more of the multiple robots in a specified path, such as controlling a robotic arm that holding a milling bit to closely follow a milling pattern. As another example, the specified task can include the plurality of robots cooperating to perform a task, such as controlling two robotic arms to hold two work pieces, and a third robotic arm to perform welding.

In some implementations, the environment can be a physical environment, e.g., a physical workcell, in which the one or more robots operate in. In some other implementations, the environment can be a virtual representation of a physical environment, e.g., a simulated operational environment, in which simulations of robot motions can be conducted. In the cases of the simulated operational environment, the system can plan the actions for the robots interactively with a simulator that receives the planned actions generated by the planning system and outputs updated state observations of the environment.

The planning process can start with obtaining state data representing a current state of the environment. The computing system generates graph data representing a graph of the current state of the environment. The computing system processes the graph data using a graph neural network to generate a graph output, and selects a respective action to be performed by each of the robots based on the graph output.

The graph representing the current state of the environment includes a plurality of nodes and a plurality of edges. Each edge connects a respective pair of nodes from the plurality of nodes. The plurality of nodes include a respective robot node for each of the robots and a respective target node for each of the target locations. The graph data includes a respective initial feature representation for each of the robot nodes and for each of the target nodes. As an example, the initial feature representation for each robot node can include one or more coordinates for tooltips, coordinates for each of the joints, and current joint angles. The initial feature representation for each target node can include coordinates of the target location.

In some implementations, the initial feature representation for one or more of the target nodes can further include compatibility information for the corresponding one or more targets. The compatibility information for a target node can identify, for example, a sub-set of the robots that are compatible for operating on the corresponding target. For example, the plurality of robots can be configured with various tooltips that are compatible or incompatible for operating on a particular target, and the compatibility information for the target node corresponding to the particular garget can indicate which robots are compatible.

In some implementations, the initial feature representation for one or more of the target nodes can further include information on orientation constraints of the corresponding one or more targets. For example, for operating on a particular target (e.g., performing spot welding on the target location), a robot arm may need to be constrained in a specific orientation or in a specific range of orientations. The orientation constraint information for the target node corresponding to the particular target can indicate the constrained orientation or the range of constrained orientations.

In some implementations, the graph can further include one or more obstacle nodes corresponding to one or more obstacle objects present in the environment. The respective initial feature representation for each of the obstacle nodes are included in the graph data.

The connective topology of the graph can be used to characterize interactive relationships among the robot nodes, the target nodes, and the obstacle nodes. For example, each robot node can be connected with an edge to each of the other robot nodes, each of the target nodes, and each of the obstacle nodes to signify interactions of a robot with another robot and interactions of a robot with a target object or an obstacle object. In some implementations, none of the target nodes or obstacle nodes are connected to any other target nodes or obstacle nodes. This configuration signifies the lack of interaction among the target and the obstacle objects and simplifies the graph processing.

In certain implementations of the method, GNN processing of the graph representations of the environment state is incorporated into an interactive planning process. Specifically, the computing system performs a plurality of planning iterations starting from a current state of the environment to generate plan data. Each planning iteration includes traversing through states of the environment starting from the current state until a leaf state of the environment is reached. Next, from state data characterizing the leaf state, the computing system generates graph data representing the graph of the leaf state of the environment and processes the graph data using the GNN to generate a graph output including updated feature representations for each of the robot nodes. Next, the computing system updates the plan data according to the updated feature representations for future iterations. Finally, after the planning iteration, the computing system selects actions for the robots using the plan data.

The implementations of the planning iterations can include a look-ahead search through a state tree having nodes representing states of the environment, for example starting from a root node that represents the current state, and [0001] traversing the state tree until a leaf node is reached. This process can include selecting one of the multiple edges connecting to a first node, based on an action score for the edge, to identify the next node in the tree. The action score can optionally be adjusted by an amount dependent upon a prior probability for the action and/or a value score that represents a predicted value of being in the state to successfully complete the task. The action probability and value score can be generated based on the updated feature representation outputted by the GNN.

The subject matter described in this specification can be implemented in particular embodiments so as to realize one or more of the following advantages. Using graph representations and graph neural network processing for planning robotic actions provides improved accuracy, efficiency, and feasibility of scaling up to a large number of robots working in parallel in a complex environment.

Robotics planning has traditionally required immense amounts of manual programming in order to dictate how the robotic components should move in order to accomplish a particular task. Manual programming is tedious, time-consuming, and error-prone. Further, a robot action control schedule that is manually generated for one work environment generally cannot be used for other work environments or for different tasks. Machine-learning techniques have demonstrated great advantages in improving adaptability in robotic control. However, there are significant challenges in using machine-learning techniques in applications involving multiple robots (e.g., robotic arms) working closely together in a relatively small cell with many tasks, which is a common setup in welding, assembly, and object manipulations. In such high-density motion planning applications, the robots are close together with highly overlapping work volumes, and the tasks are numerous with no prescribed arm assignments or completion orders. Motion-planning has to be done while taking into account other robots moving at the same time to avoid collisions. Further, the optimal assignment and scheduling of robotic arms to targets is not known in advance, and must be determined in conjunction with collision avoidance. These features make the scalability of existing systems and methods a major challenge, as the time complexity of most conventional algorithms is exponential in the number of arms and the number of targets. As a result, in real-world applications, high-density motion planning (i.e., motion planning for multiple robots working closely together) is typically performed manually in a process that is slow and repetitive, and any change to the tasks or the environment requires a time-consuming re-planning.

Implementation using multi-layer perceptron (MLP) networks to represent policy and value functions in reinforcement learning suffer exponential scaling similarly to conventional methods, as the model does not take advantage of the structure of the scene, and does not reuse learned knowledge between robots and between robot-robot pairs (for collision avoidance), and robot-target pairs (for motion planning).

By contrast, graph representations of the environment state can encode the structure of the scene into the network architecture to allow for knowledge reuse through weight-sharing, and provide an efficient representation of the complex interaction relationships among the plurality of robots and between the robots and objects in the environment in a structured data space. The GNN processing allows each robot node to efficiently learn an embedding containing information about its interaction with other objects in the environment to generate the planned actions to be executed according to the environment state. Advantages of such an approach include the ability to learn effectively in very large/complex state spaces. In concrete terms, this translates to a machine-learning system that achieves substantially improved performance on planning the movements of a plurality of robots whilst at the same time substantially reducing the amount of processing power and/or processing time. The reduced processing power can translate, in implementations, into a significantly reduced electrical power consumption or the amount of specialist hardware needed to perform the planning operation. The reduced processing time enables real-time control of a large number of robots in a complex work environment. Additionally, by incorporating GNN processing of the graph representations of the environment state with the look-ahead search, the quality of the multi-robot planning and coordination can be significantly improved, such as generating robot actions that significantly reduce the time it takes to complete multiple tasks by the multiple robots.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram of another example process for generating robot actions from state data with planning iterations.

Like reference numbers and designations in the various drawings indicate like elements.

DETAILED DESCRIPTION

This specification generally describes a system that uses graph neural network (GNN) processing to coordinate the actions of a plurality of robots in an environment. The goal of the action planning is to generate action plans and schedules for all the robots to perform specified tasks in an optimal time frame without colliding with each other or colliding with other objects in the environment.

In this specification, a robot refers to a machine having one or more movable components that can be controlled by command signals to move the robot to desired positions, poses, or both. One example of a robot is a remotely-controlled vehicle that can be controlled to reach a target location with a specified motion path. Another example of the robot is a robotic arm that has a base position, one or more joints, and optionally a tooltip. One or more of the joints can include motorized actuators to vary the joint angles, so as to control the pose and tip position of a robotic arm with a motion path. A robotic arm can have a number of degrees of freedom depending on the number of joints and/or the type of the tooltip.

In this specification, a task is an operation to be performed by the robot. An example of the tasks for a plurality of remotely-controlled vehicles is to drive each of the vehicles to a respective one of a plurality of target locations. Another example of the tasks for a plurality of robotic arms is for each robotic arm to reach a respective target object and optionally perform an operation on the target object. The operation can include picking up, moving, part positioning, welding, surface sanding the target object, to name a few examples.

In this specification, an action generated for a robot is a data structure that includes values for some or all of the controllable degrees of freedom for the robot. When a robot receives a generated action, the generated action controls an operation of the robot. For example, a generated action including updated joint positions and/or joint angles sent to a robotic arm can control the robotic arm to make a movement specified by the parameter values in the action. As another example, the generated action can include respective torques to be applied to each of the joints of the robotic arm.

Figure 1:
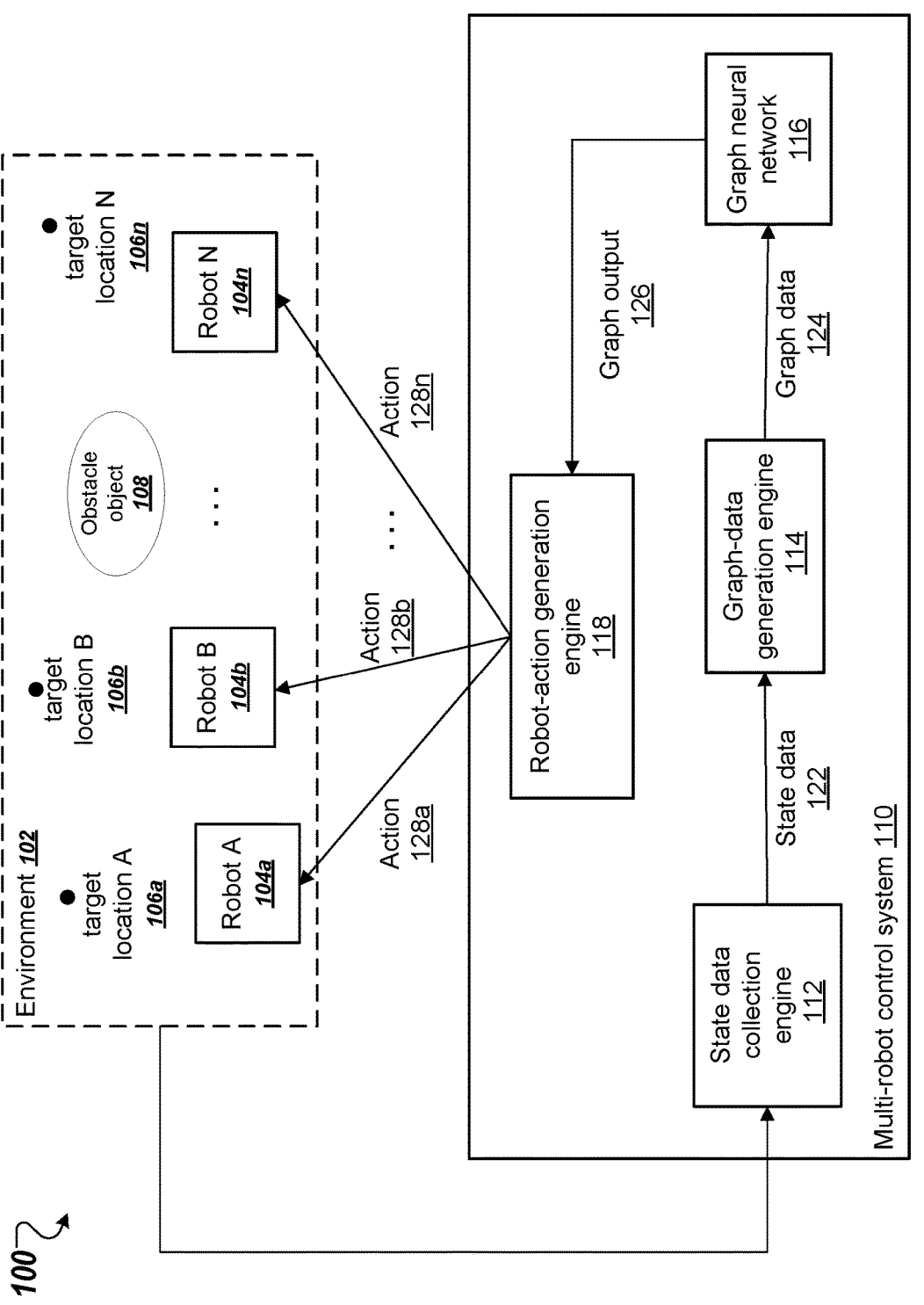
FIG. 1 shows an example multi-robot control system.

FIG. 1 shows an example multi-robot control system 110.

The multi-robot control system 110 is an example of a system implemented as computer programs on one or more computers in one or more locations in which the systems, components, and techniques described below are implemented.

The multi-robot control system 110 controls a plurality of robots 104a-104n in an environment 102 that includes a plurality of target locations 106a-106n. The target locations are locations associated with tasks of the robots, for example, they can be locations intended to be reached by one or more of the robots according to the tasks. The environment 102 can further include one or more obstacle objects 108. The obstacle objects 108 can be any object in the environment whose position is not controlled by the system 110, i.e., any object in the environment other than the robots 104a-104n.

In some implementations, the environment 102 can be a physical environment, e.g., a physical workcell, in which the one or more robots operate in. In some other implementations, the environment 102 can be a virtual representation of a physical environment, e.g., a simulated operational environment, in which simulations of robot motions can be conducted.

At each of the multiple time steps, the multi-robot control system 110 collects state data of the environment, and controls the robots 104a-104n by selecting a respective action for each of the robots at the time step.

After the multi-robot control system 110 selects an action at a specific time step, the system updates the state data, and obtains a reward signal according to the updated state data. The reward signal is associated with a goal to be achieved by the system 110 by controlling the robots. For example, the goal can be achieving the tasks of moving each of the robot arms to reach a respective one of the target locations in the shortest time frame without the robotic arms colliding with each other or colliding with one of the objects in the environment. Thus, the system 110 can assign a large positive value to the reward signal and terminate the episode when the task is achieved, assign a large negative value to the reward signal and terminate the episode when a collision takes place, and account for time lapse, assign a small negative value or a discount coefficient to each additional time step. In another example, the system can use a shaped reward signal, e.g., by assigning a positive value to the reward signal for each time step in which a robot is moving closer to a target, and negative value to the reward signal for each time step in which a robot is moving away to a target. By using a shaped reward signal, the system can overcome the challenges associated with sparse reward signals.

In one particular example, to calculate the reward, the system first calculates a score for the state as the mean of scores for each target. Target scores are set to 1 for targets that have been solved (e.g., reached by a robot tool tip with a particular orientation), or a shaped reward up to 0.5 for targets that have not been solved. A target score can be a combination of a distance score and an orientation score. The scores can be computed as $$S_{distance} = 0.5 \times \frac{0.5}{0.5 + distance}$$

$$S_{orientation} = 0.5 \times \left(1 - \frac{angular\_dist - \frac{20}{180}\pi}{\pi - \frac{20}{180}\pi}\right)$$

$$S_{mixed} = (0.5 + 0.5 * S_{orientation}) \times S_{distance}$$

The combination of the two scores ensures that the orientation score is only taken into account once the end effector is close to the target. The reward at each time-step can be defined as the score difference between that state and the previous step, with a small penalty for joint space acceleration to encourage smoothness.

The system 110 can use an expected cumulative future reward to guide the sections of the actions at each of the multiple time steps. A cumulative future reward for a specific time step can be, e.g., a time-discounted sum of future rewards that are received starting after the action at the time step is performed by the robots. An "expected" cumulative future reward for a given action at a specific time step is an estimate generated by the system 110 of the cumulative future reward that would be received if the given action is performed at the specific time step.

The multi-robot control system 110 includes a state data collection engine 112 that at each of the multiple time steps, collects state data 122 characterizing states of the environment 102. In the cases of the environment 102 being physical environment, the state data 122 can be generated by sensors such as cameras and position sensors in the environment 102. The state data collection engine 112 can receive the state data 112 directly from the sensors, or process the sensor data to generate the state data. The state data includes information about the robots, the target locations, and the obstacle objects, including, for example, the position coordinates of each of the robots, target locations, and obstacle objects. The robot information can also include coordinates of the tooltips of each robot, the coordinates of the joints, and joint angles of each joint of the robots, as well as motion parameters such as velocities and accelerations of the robots or components of the robots. In the cases of the environment being a simulated environment, the state data 122 can be generated by a simulator that receives the actions generated by the planning system and outputs updated state observations of the environment.

The multi-robot control system 110 further includes a graph-data generation engine 114 that at each of the multiple time steps, generates graph data 124 representing a graph from the state data. The graph includes a plurality of nodes and a plurality of edges, with each edge connecting a respective pair of nodes in the graph.

The nodes in the graph can be categorized as robot nodes that represent the robots 104a-104n, target nodes that represent the target locations 106a-106n, and obstacle nodes that represent the obstacle objects 108.

The graph-data generation engine 114 maps the robots 104a-104n to the robot nodes, mapping the target locations 106a-106n to the target nodes, and mapping the obstacle objects 108 to the obstacle nodes. The mappings of the robot nodes and the mapping of the target nodes can be one-to-one mappings, that is, the graph-data generation engine 114 maps each robot to a corresponding robot node, and maps each target location to a corresponding target node.

The mappings of the obstacle nodes can be one-to-one mappings as well, that is, the graph-data generation engine 114 maps each obstacle object to a corresponding object node. Alternatively, the graph data generation engine 114 can perform geometrical decomposition of an obstacle object that has a non-trivial size and/or shape, and map the obstacle object to a plurality of obstacle nodes corresponding to a plurality of locations.

In mapping the robots, target locations, and obstacle objects to the respective nodes in graph 200, the graph-data generation engine 114 encodes state data about the robots, target locations, and obstacle objects into initial feature vectors of the corresponding nodes. For example, the initial feature vector associated with a robot node can include the position coordinates, joint position coordinates, and joint angles of the corresponding robot. In one particular example, the feature vector of a robot node (e.g., a node representing a robotic arm) can be a concatenation of multiple parameters specifying one or more of: joint configurations, joint velocities, base position and orientation, tool center point TCP position and orientation, and/or dwelling status.

The initial feature vector associated with a target node or an obstacle node can include the position coordinates of the corresponding target position or obstacle object. The initial feature vectors are included in the graph data.

In some implementations, the initial feature representation for one or more of the target nodes can further include compatibility information for the corresponding one or more targets. The compatibility information for a target node can identify, for example, a sub-set of the robots that are compatible for operating on the corresponding target. For example, the plurality of robots can be configured with various tooltips that are compatible or incompatible for operating on a particular target, and the compatibility information for the target node corresponding to the particular garget can indicate which robots are compatible.

In some implementations, the initial feature representation for one or more of the target nodes can further include information on the orientation constraints of the corresponding one or more targets. For example, for operating on a particular target (e.g., performing spot welding on the target location), a robot arm may need to be constrained in a specific orientation or in a specific range of orientations. The orientation constraint information for the target node corresponding to the particular target can indicate the constrained orientation or the range of constrained orientations. In one particular example, the feature vector of a target node can be a concatenation of multiple parameters specifying target position and orientation, and target status (e.g., 0 for pending, 0-1 for dwelling progress, 1 for done).

The edges in the graph are used to characterize interactive relationships among the robots, target locations, and obstacle objects. The graph-data generation engine 114 can encode information about the edges in an adjacency matrix or an adjacency list, which is also included in the graph data. In some implementations, the graph data further includes an initial feature vector indicating edge features for each edge. The edge features of a particular edge can encode distance, relative positions, and/or relative orientations of the two nodes connected by the particular edge. In one particular example, the feature vector for a robot-robot edge can be a concatenation of multiple parameters specifying one or more of: TCP to TCP relative position and orientation, a distance score for the robot pair, and an orientation score of the robot pair. In another example, the feature vector for a robot-target edge can be a concatenation of multiple parameters specifying TCP to target relative position and orientation.

Each robot node is connected to each of the other robot nodes with an edge, so that a potential interaction between the pair of robots can be characterized by the graph. Each edge connecting two robot nodes can indicate interactions such as potential collision as well as communications between the robot notes. For example, a particular edge connecting two robot nodes can indicate information for coordinating the two robot nodes, such as indicating which one of the robot nodes is reaching which target location. Each robot node is further connected to each of the target nodes with an edge to characterize the robot's interaction with the corresponding target, e.g. approaching or reaching the target. Each robot node is further connected to each of the obstacle nodes with an edge to characterize the robot's interaction with the corresponding obstacle object, e.g, approaching or colliding with the obstacle object.

In some implementations, none of the target nodes or obstacle nodes are connected to any other target nodes or obstacle nodes. The absence of target node-to-target node connections, obstacle node-to-obstacle node connections, and target node-to-obstacle node connections in the graph signifies the lack of interaction among the target locations and the obstacle objects and simplifies the graph.

After the graph data is generated, the multi-robot control system 110 processes the graph data 124 using a graph neural network 116 to generate a graph output 126. The GNN can include one or more message passing layers that operates on the feature representations of the robot nodes, target nodes, and obstacle nodes. The graph output can include updated node features for the plurality of robot nodes and, optionally, updated feature representations for the target nodes and the obstacle nodes. In some implementations, the graph output further includes updated feature representations for the edges. In processing the graph data 124 using the GNN 116, the system 110 can efficiently embed the potential interactive relationships of robot nodes, target nodes, and target nodes, as well as the initial features of the nodes in the updated node features of the robot nodes in the graph output 126.

The multi-robot control system 110 further includes a robot-action generation engine 118 that at each of the multiple time steps, generates the actions 128a-128n to be performed by the robots 104a-104n using the graph output 126.

More specifically, in some implementations, the robot-action generation engine 118 generates the actions by processing each updated node feature using an action decoder neural network, e.g., a fully connected neural network that outputs a selection of an action to be performed by the corresponding robot.

In some other implementations, instead of directly predicting the actions 128a-128n from the graph output 126, the robot-action generation engine 118 can perform a plurality of planning iterations to generate plan data, and generate the actions 128a-128n according to the plan data. For example, in each planning iteration, the robot-action generation engine 118 can traverse through states of the environment starting from the current state until a leaf state of the environment is reached, process the state data at the leaf state to generate an update, and use the generated update to update the plan data. The planning interactions enable the robot-action generation engine 118 to perform a look-ahead search, which can significantly improve the system's performance for coordinating multiple robots.

The multi-robot control system 110 can further perform neural network training to update the parameters for the GNN 116 and the neural networks used by the robot-action generation engine 118 based on expected returns associated with the graph output 126 and/or the generated actions 128a-128n.

Figure 2A:
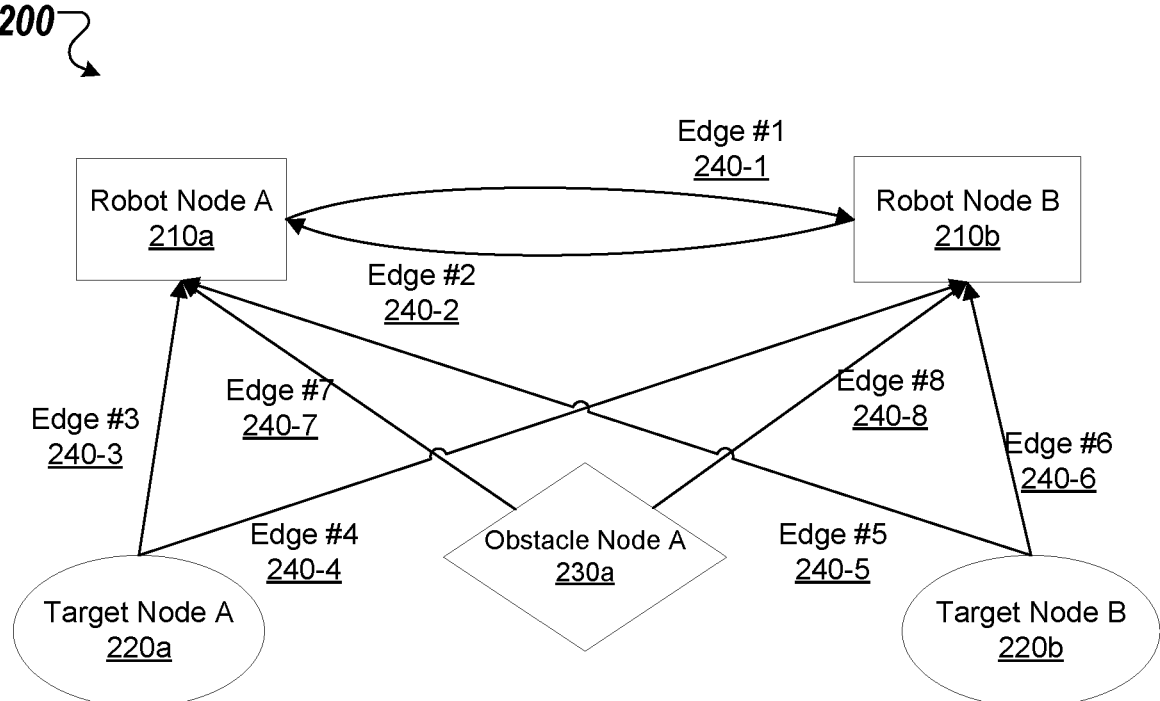
FIG. 2A shows an example of a graph representation of an environment including multiple robots interacting with a target location and an obstacle object.

FIG. 2A shows an example of a graph 200 representing an environment including two robots interacting with two target locations and an obstacle object. The graph 200 includes the robot node 210a representing a first robot, the robot node 210b representing a second robot, the target node 220a representing a first target location, the target node 220b representing a second target location, and an obstacle node 230a representing an obstacle object.

Graph 200 further includes Edges #1-#8. These edges are shown with arrow directions to illustrate message passing directions in the GNN processing. Edges #1 and #2 connect the two robot nodes 210a and 210b, which pass messages to each other. Edges #3 and #4 connect the target node 220a respectively to robot nodes 210a and 210b. The target node 220a passes messages to each of the robot nodes 210a and 210b, but does not pass messages to the other target node 220b or the obstacle node 230a. Similarly, Edges #5 and #6 connect the target node 220b respectively to robot nodes 210a and 210b. The target node 220b passes messages to each of the robot nodes 210a and 210b, but does not pass messages to the other target node 220a or the obstacle node 230a. Edges #7 and #8 connect the obstacle node 230a respectively to robot nodes 210a and 210b. The obstacle node 230a passes messages to each of the robot nodes 210a and 210b, but does not pass messages to either of the target nodes 220a and 220b.

As shown in FIG. 2A, in graph 200, each robot node is connected to, and receives messages from, each of the other robot nodes with an edge, so that a potential interaction between the pair of robots can be characterized by the GNN processing, i.e., by the message passing performed by the GNN. Each robot node is further connected to, and receives messages from, each of the target nodes with an edge to characterize the robot's interaction with the corresponding target location, e.g. approaching or reaching the target location. Each robot node is further connected to, and receives messages from, each of the obstacle nodes with an edge to characterize the robot's interaction with the corresponding obstacle object, e.g, approaching or colliding with the obstacle object.

By contrast, none of the target nodes or obstacle nodes are connected to any other target nodes or obstacle nodes. Further, none of the target nodes or obstacle nodes receive inputs from any other nodes, as illustrated by the arrow directions of the edges. The absence of target node-to-target node connections, obstacle node-to-obstacle node connections, and target node-to-obstacle node connections in the graph signifies the lack of interaction among the target locations and the obstacle objects and simplifies the GNN processing.

The graph in FIG. 2A is for illustration purposes only. In general, the multi-robot control system can generate and process a larger graph than is shown in FIG. 2A for a robotic-control application having a greater number of robots operating in a complex environment including a greater number of obstacle objects, a greater number of target locations, or both.

Figure 2B:
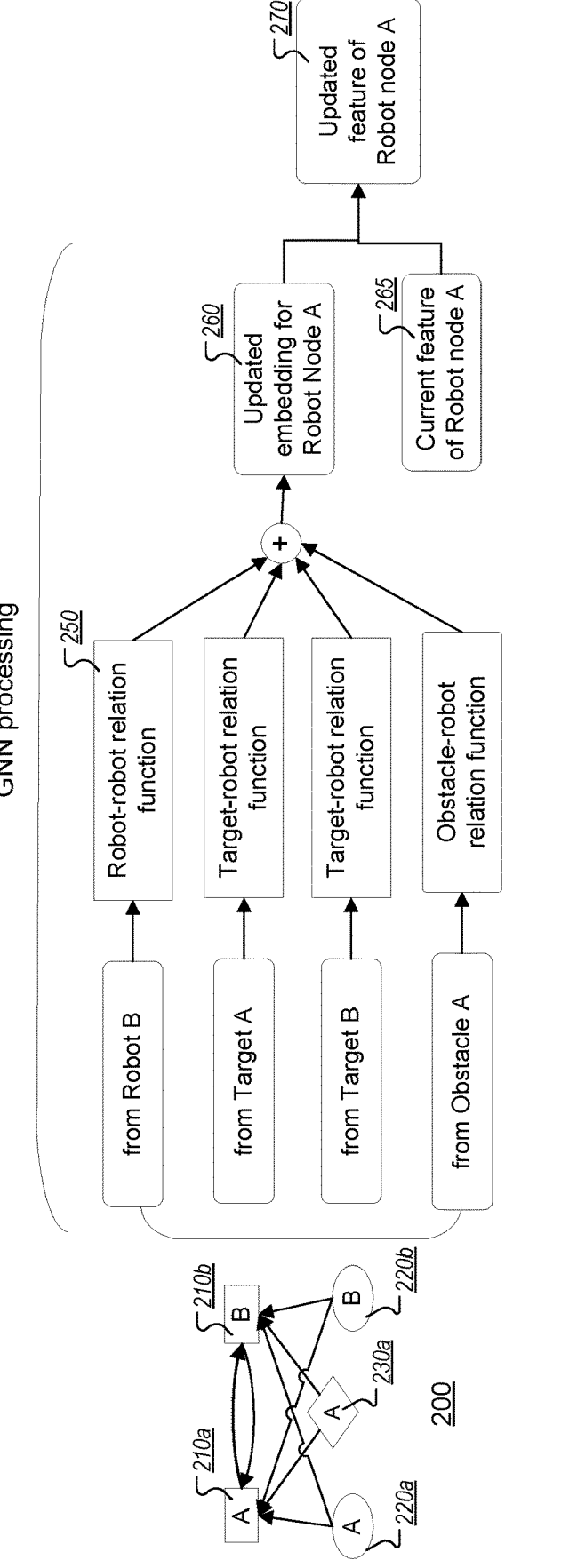
FIG. 2B is a diagram illustrating processing graph data for a robot node to generate an updated feature representation for the robot node.

FIG. 2B is a diagram illustrating GNN processing of the graph data of the graph 200. Various architectures can be used for the GNN. As an example, FIG. 2B shows a process using a GNN with an interaction network architecture.

As shown in FIG. 2B, the graph data includes node features of the two robot nodes 210a and 210b, two target nodes 220a and 220b, and one obstacle node 230a in the graph 200. For each of the robot nodes, message passing is performed to gather information from other nodes. For robot node A, node features of robot node B, target node A, target node B, and obstacle node A, are gathered (as shown in the bold arrowed lines), processed using relation functions 250, and aggregated to form an updated embedding 260. Examples of the relation functions 250 include multi-layer perceptrons or attention layers with learnable weights. The system 110 then performs an updating to generate updated feature 270 for robot node A based on the current feature 260 and the updated embedding 260 of robot node A.

System 110 performs the message passing process for all robot nodes. Optionally, system 110 performs the message passing multiple times using additional message passing layers. Each message passing layer contains network parameters that are learned during training.

The GNN can adopt any appropriate network architecture, such as the message-passing neural network (MPNN), the non-local neural networks (NLNN), the CommNet, the Relation Networks, and so on. Although different types of architectures can be used for the GNN, for any given node, in each message passing layer, the system 110 updates the feature representation of the node based only on feature representations of nodes that are connected to the node by an edge of the graph. Further, in certain implementations, such as illustrated by FIG. 2A and FIG. 2B, only the robot nodes are updated in the message passing layers using inputs from the other robot nodes, the target nodes, and the obstacle nodes. None of the target nodes or obstacle nodes receive inputs from any other nodes, as illustrated by the arrow directions of the edges in the graph 200.

Figure 3:
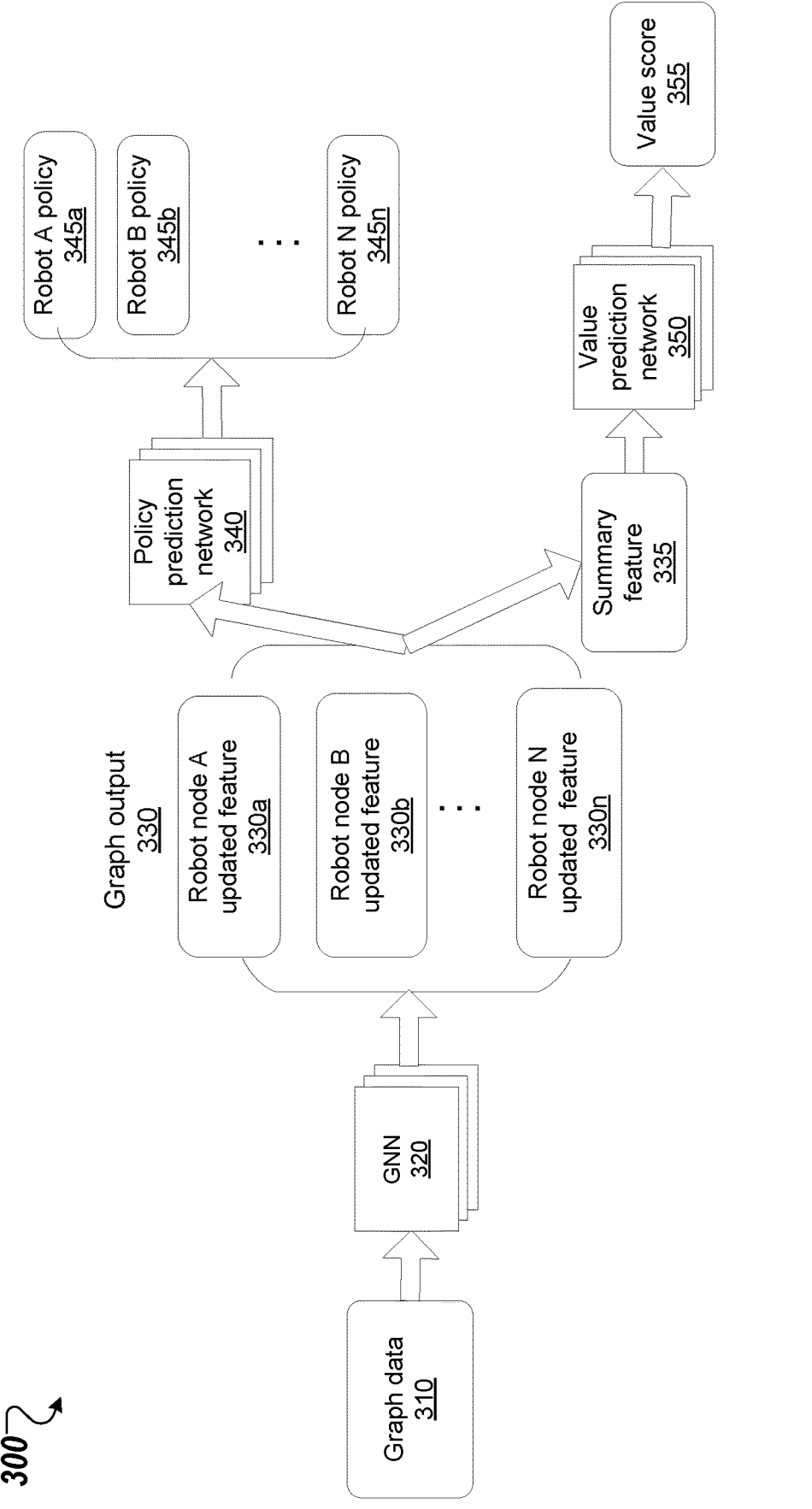
FIG. 3 is a diagram illustrating processing the graph data to generate value and policy predictions for robot action planning.

FIG. 3 is a diagram illustrating processing the graph data to generate policy and value predictions. Graph data 310 can include feature representations of the robot nodes, the target nodes, and the obstacle nodes. The GNN 320 performs one or more rounds of message passing between the nodes, and generates the graph output 330. The graph output 330 includes updated robot-node feature representations 330a-330n, and optionally further includes updated feature representations for the target and obstacle nodes (not shown in FIG. 2B).

The action generation engine 118 of the system 110 further processes the graph output 330 using a policy prediction neural network 340, e.g., a multi-layer perceptron or a recurrent neural network, to generate a predicted policy output including a plurality of policies 345a-345n for the plurality of robots. Each of the policies 345a-345n can define a probability distribution over possible actions to be performed by the corresponding robot. For example, the policy can include a respective action probability for each action in a set of possible actions that can be performed by the robot to interact with the environment. In another example, the policy can include parameters of a distribution over the set of possible actions. The system 110 can select the action with the highest probability or by sampling from the probability distribution.

The action generation engine 118 can further generate a summary feature 335 from the graph output 330 and processes the summary feature 335 using a value prediction neural network 350, e.g., a multi-layer perceptron or a recurrent neural network, to predict a value score 355. For example, the action generation engine 118 can combine, e.g., by averaging, summing, or processing using a multi-layer perceptron, the updated features of the robot nodes to generate the summary feature. The value score 355 defines an expected return i.e., an expected cumulative future reward, as a result of the robots interacting with the target locations and the obstacle objects according to the selected actions.

In some implementations, the action generation engine 118 can directly use the predicted policies 345a-345n to identify an optimal action from the set of possible actions to be performed by the corresponding robot based on the current state data. For example, the policy can identify joint velocity or torques to be applied to one or more joints of the corresponding robot in the optimal action. In one particular example, the identified optimal action can specify normalized joint velocities (e.g., with range of [−1, 1] in each dimension) at the given time-step. In order to increase resolution closer to 0 to allow finer control when approaching targets, the action generation engine 118 can discretize the normalized joint velocities and map them exponentially to the full joint velocity range allowed by the robot, as:

$$y = \text{sign}(x) \times q_{\text{max}} \times \frac{e^{|x|-1} - e^{-c}}{1 - e^{-c}}$$

where x is the raw output, $q_{max}$ is the maximum joint velocity, and c=1.0 is a tunable parameter.

In these implementations, the system 110 can further learn the parameters of the policy prediction network 340, the graph neural network, 320, and, when used, the parameters of the value prediction network 350 by training the network(s) through reinforcement learning. After training, the system 110 can discard the value prediction network 350 because the output of the value prediction network 350 is only used to improve the training of the policy prediction network 340 and the graph neural network and is not directly used to select actions.

The system 110 can train the networks 340 and 350 using any appropriate reinforcement learning techniques, e.g., an actor-critic technique, a policy gradient based technique, and so on. In some implementations, the system can train the networks from recent experiences (i.e., trajectories including observations, actions, and, optionally, rewards for previous time steps) stored in a replay memory. Generally, the trajectories can be derived from experience information generated as a consequence of the interactions of the robots with the environment or with another instance of the environment for use in training the models. Each trajectory represents information about an interaction of the agents with the environment.

Figure 4A:
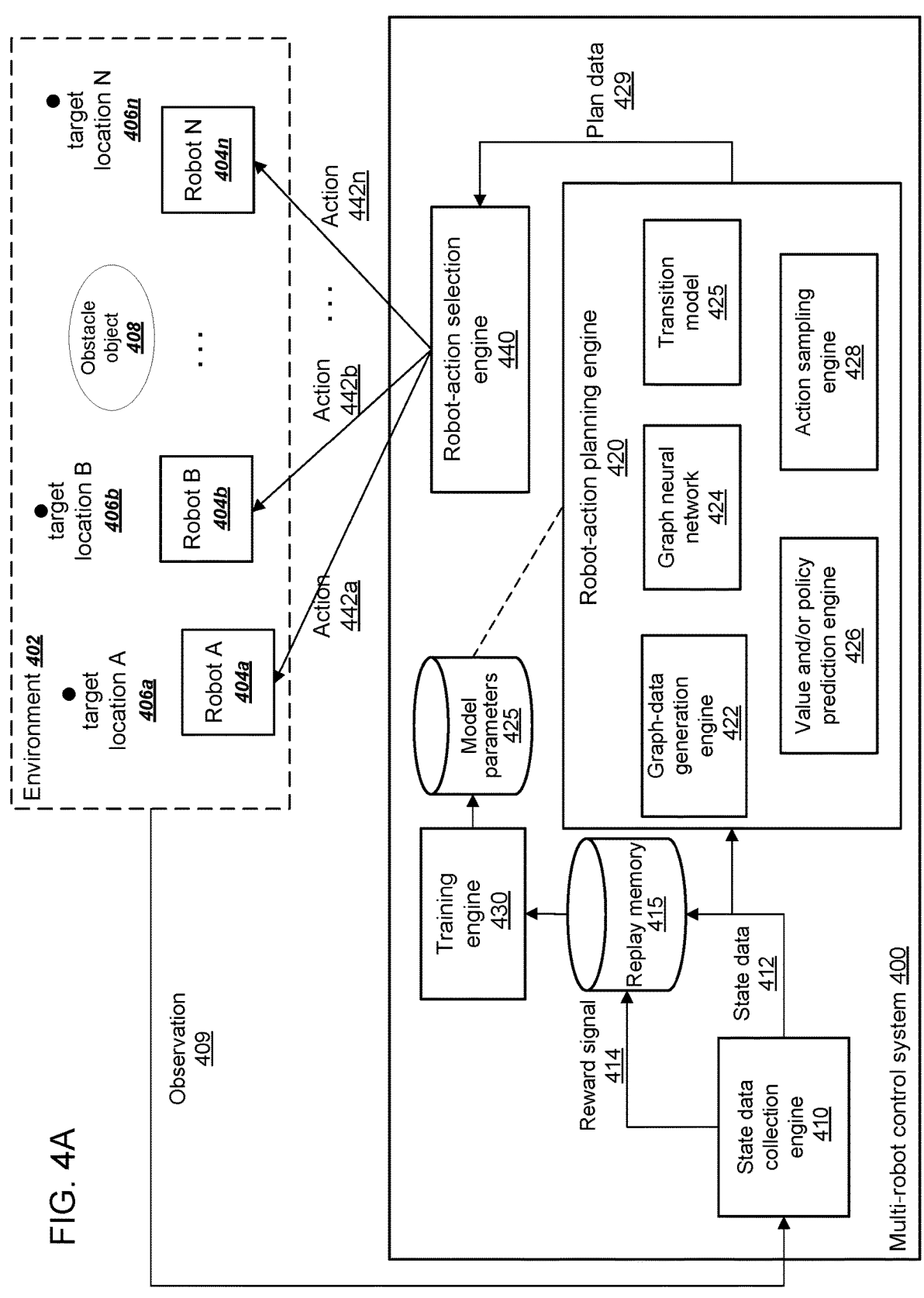
FIG. 4A shows an example of a multi-robot planning and control system.

FIG. 4A shows an example of a multi-robot planning and control system 400. Compared to the multi-robot and control system 110 shown in FIG. 1, the system 400 incorporates the GNN processing with a planning process. Specifically, the system 400 includes a robot-action planning engine 420 that includes a graph-data generation engine 422, a graph neural network 424, a prediction engine 426, and an action sampling engine 428. The system further includes a state data collection engine, a robot-action selection engine 440, and a training engine 430.

Similar to the system 110 shown in FIG. 1, the planning and control system 400 controls a plurality of robots 404a-404n in an environment 402 that includes a plurality of target locations 406a-406n. The target locations are locations associated with tasks of the robots, for example, they can be locations intended to be reached by one or more of the robots according to the tasks. The environment 402 can further include one or more obstacle objects 408.

At each of the multiple time steps, the planning and control system 400 selects actions 442a-442n to be performed respectively by the robots 404a-404n. The state of the environment 402 at the time step depends on the state of the environment at the previous time step and the actions performed by the robots at the previous time step. The state data collection engine 410 of the system 400 receives a current observation 409 characterizing a current state of the environment 402, and generates the state data 412 based on the current observation 409. The state data collection engine 410 can further receive a reward signal 414 based on the current observation 409. The reward signal 414 for a given time step indicates progress toward the robots accomplishing the goals.

The robot-action planning engine 420 performs a plurality of planning iterations to generate plan data 429. The plan data 420 can include data that indicates a respective value of the robots performing each of a set of possible actions in the environment 402 when the environment is in the current state.

In particular, the planning engine 420 performs a plurality of iterations and uses the results of each iteration to update the plan data 429.

At each planning iteration, the robot-action planning engine 420 generates a sequence of actions that progress the environment 402 to new, predicted future states starting from the state represented by the current observation 409. The plan data 429 allows for the system 400 to effectively select an actual action to be performed by each of the robots 404a-404n in response to the current observation 409 taking account of possible future states of the environment starting from the current state of the environment.

The planning engine 420 can generate the plan data 429 by performing a look-ahead search guided by the data that indicates respective values for the set of possible actions. The look-ahead search can be a tree search, e.g., a Monte-Carlo tree search, where the state tree includes nodes that represent states of the environment 402 and directed edges that connect nodes in the tree. An outgoing edge from a first node to a second node in the tree represents an action that was performed in response to an observation characterizing the first state and resulted in the environment transitioning into the second state.

In particular, at each planning iteration, the engine 420 traverses the state tree starting from the root node that represents the current state until reaching a leaf node in the state tree, i.e., a node that has no outgoing edges in the state tree. The engine 420 then expands the leaf node and uses the results of the expansion and of the traversal to update statistics for the nodes that were traversed, including the value estimates for the root node. The tree search process will be further described by FIG. 4B and accompanying descriptions. In general, the planning engine 420 includes a graph-data generation engine 422, a graph neural network 424, a transition model 425, a value and/policy prediction engine 426, and optionally, an action sampling engine 428. The planning engine 420 can include a reward prediction model for predicting a reward for an action.

Similar to 114 of FIG. 1, the graph-data generation engine 422 generates graph data that maps the state data 412 to a graph. The graph includes a plurality of nodes representing the robots, target locations, and optionally target objects, as well as the plurality of edges connecting the nodes. Specifically, the graph-data generation engine 422 maps the robots 404a-404n to robot nodes, maps the target locations 406a-406n to target nodes, and optionally maps the obstacle objects 408 to obstacle nodes in the graph.

The transition model 425 generates, for each outgoing edge from a first node to a second node in the search tree, a next state for the second node that the environment would transition into based on the current state represented by the first node and the action taken. The transition model 425 can be implemented as a GNN.

In certain implementations, the input and output of the transition model 425 are in the "real state" data space for the environment observations. That is, the transition model 425 operates on data that indicate physically meaningful parameters of the environment observation, including, e.g., the joint positions, and angles of the robots, target locations, and positions of obstacle objects.

In some implementations, the transition model 425 can operate on "hidden state" data corresponding to the environment states. That is, the input and output of the transition model 425 are lower-dimensional representations of the environment observations. For example, the input of the transition model 425 can include data outputted by the graph neural network 424 which computes embeddings (i.e., lower-dimensional representations) of the observations. The output of the transition model 425 can be in the same data space as the input, i.e., in the same data space as the data outputted by the graph neural network 424.

The planning engine can use GNN 424 to process graph data corresponding to a state representation at a leaf node in the search tree, and generates the graph output with embeddings of the state representations of the leaf node. When the transition model 425 operates on the "real state" data space, the system 400 can use the graph-data generation engine 422 to map the leaf node state into the graph data representation as the input of the GNN of the transition model 425. Alternatively, when the transition model 425 operates on the "hidden state" data space, the GNN of the transition model 425 can use the embeddings of the state representations outputted by GNN 424.

The prediction engine 426 is configured to process the graph output generated by the GNN 424, to predict the quantities most directly relevant to planning, including the action-selection policy, the value function, and, when relevant, the reward. The predicted policy output can define a score distribution over a set of possible robot action combinations that can be performed by the respective robots. Each action combination includes the actions to be performed by the plurality of robots. For example, the predicted policy output can include a respective numerical probability value for each combination of robot actions in the set of possible action combinations. The respective numerical probability value can be the probability of the corresponding action combination being the best to take given the state. The value output can further specify a numerical value that represents an overall progress toward the robots accomplishing the tasks when the environment is in the given environment state.

The prediction engine 426 can include a neural network with any appropriate architecture to process the graph output. For example, the neural network of the prediction engine 426 can include an input layer that receives a hidden state input, followed by one or more convolutional layers, or one or more fully connected layers, and an output layer that outputs the score distribution. The prediction engine 426 can also include a separate policy prediction network and a value prediction network to predict the policies and values respectively.

The action sampling engine 428 is configured to receive as input the predicted policy output of the prediction model 150 and to process the input to generate as output data defining a sampling distribution. The sampling distribution can be a distribution over some or all of the possible actions that can be performed by the robots, e.g., may include a respective numerical probability value for each of multiple actions in the entire set of possible actions. During planning, the planning engine 428 can sample a number of actions from the sampling distribution to generate a proper subset of actions that will be used to expand the state tree, i.e., will be added as outgoing edges to the leaf node.

After planning, the system 400 proceeds to select the actual actions 442a-442n to be performed by the respective robots based on the plan data 429. The plan data 429 can include statistics data that has been compiled during planning for each outgoing edge of the root node of the state tree, i.e., the node that corresponds to the state characterized by the current observation 409, and the robot-action selection engine 440 can select the actual actions 442a-442n based on the statistics data for the node-edge pairs corresponding to the root node.

For example, the robot-action selection engine 440 can make this selection proportional to the visit count for each outgoing edge of the root node of the state tree. That is, an action from the set of all possible actions that has been selected most often during planning when the environment 402 is in a state characterized by the current observation 409, i.e., the action corresponding to the outgoing edge from the root node that has the highest visit count in the plan data, may be selected as the actual actions 442a-442n to be performed by the robots in response to the current observation. As another example, the robot-action selection engine 440 can make this selection by first determining, from the sequences of actions in the plan data, a sequence of actions that has a maximum associated value, and then selecting, as the actual actions 442a-442n to be performed by the respective robot in response to the current observation 409, the first action in the determined sequence of actions.

The training engine 430 trains the models included in the planning engine 420 to learn the model parameters 425, so that the planning engine 420 generates plan data based on which the optimal robot actions can be effectively selected. The optimal robot actions can be actions that maximize the expected cumulative reward received by the system 400. The expected cumulative reward can be a long-term time-discounted sum of rewards received by the system 400, for performance by the robots when interacting with the environment.

The training engine 430 trains the GNN 422 and the models in the prediction engine 422 using an appropriate training technique, e.g., an end-to-end by backpropagation-through-time technique, to jointly and iteratively adjust the values of the set of model parameters 425.

In some implementations, the training engine 430 trains the models included in the planning engine 420 from recent experiences (i.e., trajectories including observations, actions, and, optionally, rewards for previous time steps) stored in a replay memory 415. Generally, the trajectories can be derived from experience information generated as a consequence of the interactions of the robots with the environment or with another instance of the environment for use in training the models. Each trajectory represents information about an interaction of the agents with the environment.

Figure 4B:
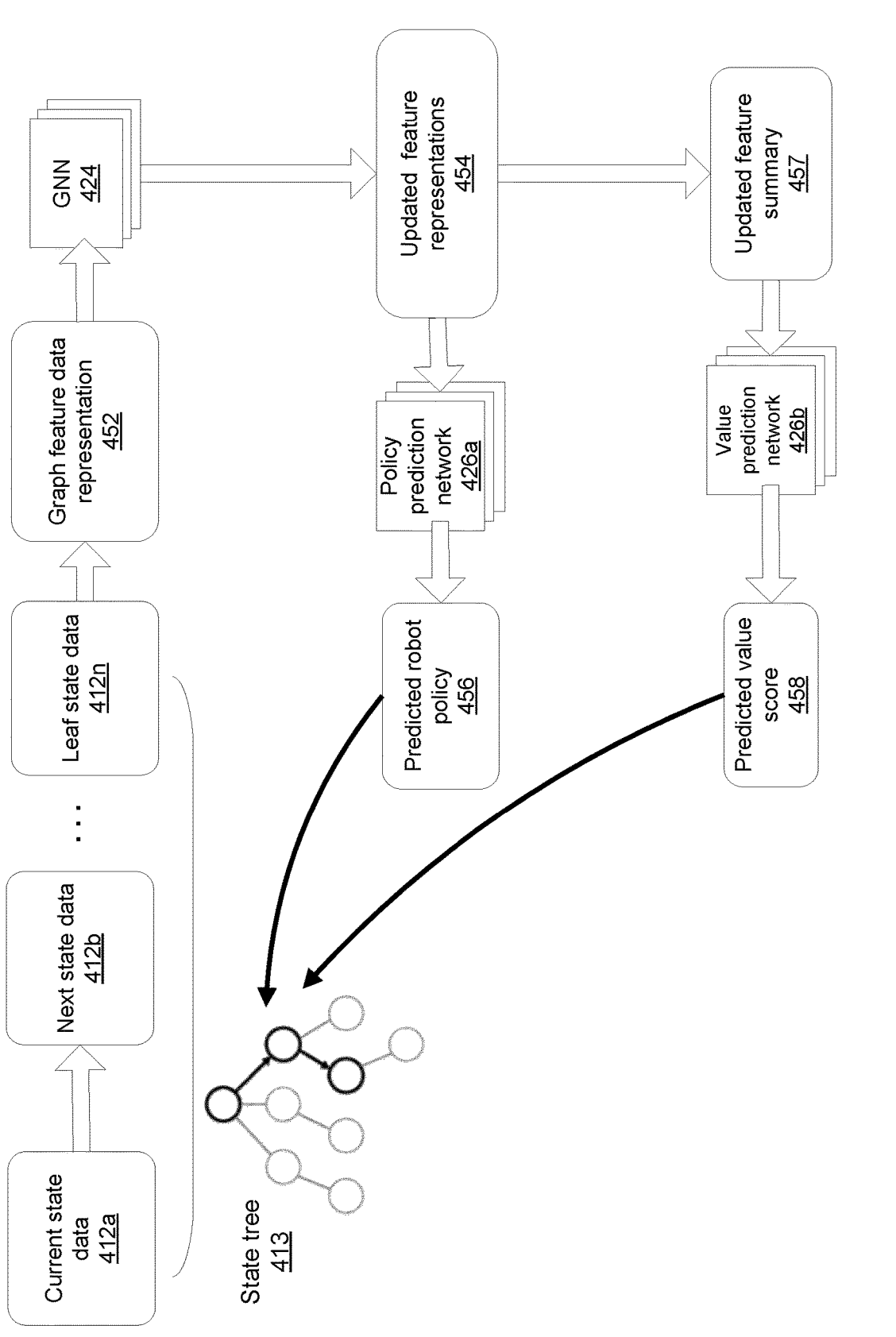
FIG. 4B is a diagram illustrating the data flow of an example of an iterative planning process for generating plan data for a plurality of robots.

FIG. 4B is a diagram illustrating the data flow of an iterative planning process for generating plan data for a plurality of robots. In each planning iteration, the planning engine 420 uses the transition model 425 to traverse through states of the environment represented by the state tree 413, starting from a current state represented by current state data 412*a*, through one or more next states represented by the next state data 412*b*, etc., until a leaf state of the environment (represented by leaf state data 412*n*) is reached. During the state tree traversing, the action-planning engine 420 can select the next state according to statistics associated with a corresponding node-edge pair in the state tree 413.

If the transition model 425 operates in the "real state" data space, the planning engine 420 uses graph-data generation engine 422 to map the leaf state data to graph feature data representation 452 of the leaf state. The GNN 424 processes the graph feature data representation 452 to generate the updated feature representation 454. A policy prediction network 426*a* of the prediction engine 426 processes the updated feature representations 454 to generate the predicted robot policy 456, and a value prediction network 426*b* of the prediction engine 426 processes an updated feature summary 457 generated from the updated feature representation 454 to generate the predicted value score 456. The planning engine 420 uses the predicted robot policy 456 and the predated value score 456 to update statistics for one or more corresponding node-edge pairs in the state tree 413 that have been traversed through to reach the leaf node. The planning engine 420 can also include the statistics of multiple node-edge pairs of the state tree 413 in the plan data, so the robot-action selection engine 440 can use the statics to select optimal actions for the robots.

The statistics data for each of some or all of the node-edge (i.e., state-action) pairs can be data that has been compiled as a result of repeatedly running the planning engine to generate different outputs starting from the node that represents the current state of the environment. For example, the plan data can include, for each outgoing edge of a root node of the state tree, (i) an action score Q for the action represented by the edge, (ii) a visit count N for the action represented by the edge that represents a number of times that the action was selected during the plurality of planning iterations, and (iii) a prior probability P for the action represented by the edge. During planning, the root node of the state tree corresponds to the state characterized by the current observation.

For any given node representing a given state of the environment, the action score Q for an action represents the current estimate of the return that will be received if the action is performed in response to an observation characterizing the given state. A return refers to a cumulative measure of "rewards" received by the agent, for example, a time-discounted sum of rewards. The agent can receive a respective reward at each time step, where the reward is specified by a scalar numerical value and characterizes, e.g., a progress of the agent towards completing an assigned task. The visit count N for the action is the current number of times that the action has been performed by the agent in response to observations characterizing the given state. And the prior probability P represents the likelihood that the action is the action that should be performed in response to observations characterizing the given state, i.e., the action that will maximize the received return relative to all other actions that can be performed in response to an observation.

The system can maintain the plan data at a memory device accessible to the system. While logically described as a tree, the plan data generated by using the planning engine may be represented by any of a variety of convenient data structures, e.g., as multiple triples or as an adjacency list.

At each planning iteration, the system can generate the sequence of actions by repeatedly (i.e., at each of multiple planning steps) selecting an action a according to the compiled statistics for a corresponding node-edge pair beginning from that corresponds to the root node, for example, by maximizing over an upper confidence bound:

$$\arg\max_{a}\left[Q(s,a)+P(s,\alpha)\cdot\frac{\sqrt{\sum_{b}N(s,b)}}{1+N(s,a)}\left(c_1+\log\left(\frac{\sum_{b}N(s,b)+c_2+1}{c_2}\right)\right)\right],$$

where c1 and c2 are tunable hyperparameters used to control the influence of the prior probability P relative to the action score Q.

Example look ahead search algorithms including action selection, state tree expansion, and statistics update algorithms are described in more detail in US patent publication 20200143239 entitled "Training action selection neural networks using look-ahead search" Simonyan et al. filed on May 28, 2018, and published on May 7, 2020, and in "Mastering the game of go without human knowledge" Silver et al. in Nature, 550:354-359, October 2017, and "Bandit based monte-carlo planning" Kocsis et al. in European conference on machine-learning, pages 282-293. Springer, 2006.

Once a leaf node is reached, the system can use the GNN 424 to expand the state tree from the leaf node and to update the planning data. Concretely, the system can use the GNN 424 to process the graph feature data representation 452 of the state data of the leaf node to generate the updated feature representation 454 of the leaf state. The system can process the updated feature representation 454 using a prediction model to generate an output that includes a predicted policy output that defines a score distribution over the set of actions. The system can sample a proper subset of the set of actions by, for example, generating data defining a sampling distribution from the score distribution, and sampling a fixed number of samples from the sampling distribution. The system then updates the state tree by adding a respective outgoing edge from the leaf node that represents each sampled action to the state tree. The system can then update the statistics by, for each sampled action, associating the respective outgoing edge representing the sampled action with a prior probability for the sampled action that is derived from the predicted policy output.

For each edge that was traversed during the planning iteration, the system can increment the visit count N for the edge by a predetermined constant value, e.g., by one. The system can also update the action score Q for the edge using the predicted value for the leaf node by setting the action score Q equal to the new average of the predicted values of all searches that involved traversing the edge.

Examples processes for updating the statistics and expanding the leaf node are described in more detail in PCT Patent Application Publication WO2021152515 entitled "Planning for agent control using learned hidden states" Schrittwieser et al. filed on Jan. 28, 2021, and published on Aug. 5, 2021, the disclosure of which is herein incorporated by reference in its entirety.

Figure 5:
FIG. 5 is a flow diagram of an example process for generating robot actions from state data.
Figure 5:
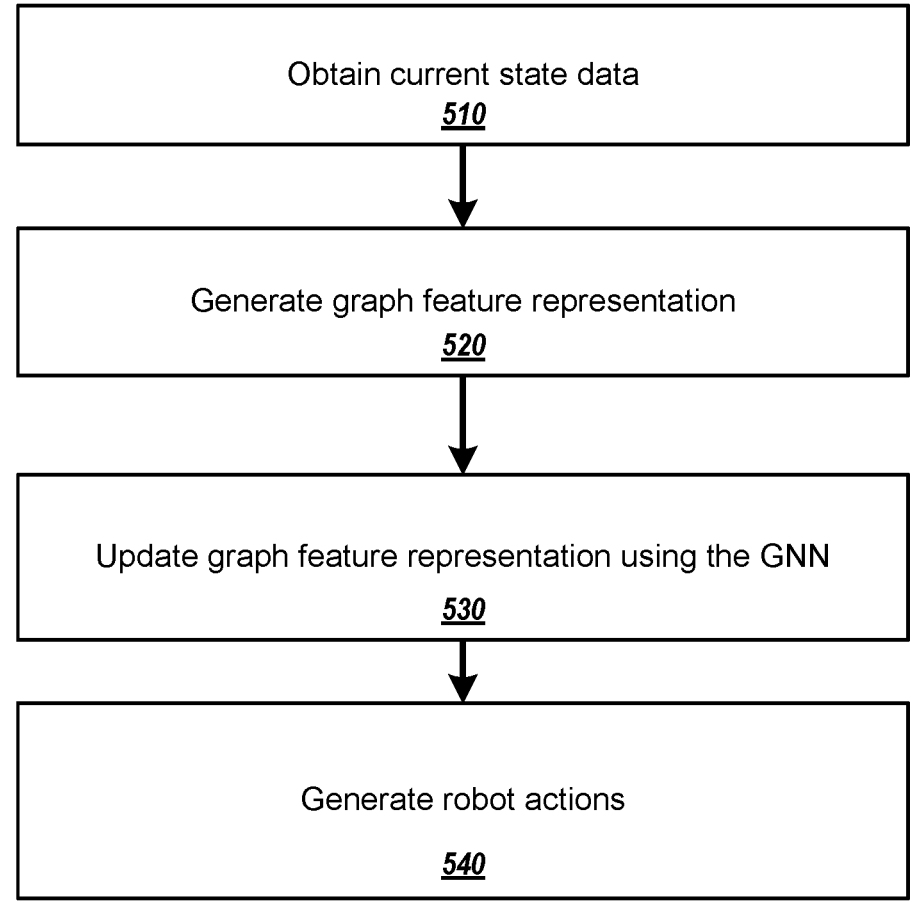

FIG. 5 is a flow diagram of an example process for generating robot actions from state data. For convenience, the process 500 will be described as being performed by a system of one or more computers located in one or more locations. For example, the multi-robot control system as shown in FIG. 1, appropriately programmed in accordance with this specification, can perform the process 500.

The system repeatedly performs the following steps in each of a plurality of time steps.

First, the system obtains state data representing a current state of the environment in step 510. The environment includes a plurality of robots, one or more target locations, and optionally one or more obstacle objects. The state data include information on the current state of the robots, target locations, and obstacle objects.

Next, the system generates, from the state data, graph data representing a graph of the current state of the environment in step 520. The graph includes a plurality of nodes and a plurality of edges. The plurality of nodes includes a respective robot node for each of the robots and a respective target node for each of the target locations, and optionally a respective obstacle node for each of the target objects. The graph data includes a respective initial feature representation for each of the robot nodes, each of the target nodes, and optionally each of the obstacle nodes.

As an example, the initial feature representation for each robot node can include one or more coordinates for tooltips, coordinates for each of the joints, and current joint angles. The initial feature representation for each target node can include coordinates of the target location.

In some implementations, the initial feature representation for one or more of the target nodes can further include compatibility information for the corresponding one or more targets. The compatibility information for a target node can identify, for example, a sub-set of the robots that are compatible for operating on the corresponding target. For example, the plurality of robots can be configured with various tooltips that are compatible or incompatible for operating on a particular target, and the compatibility information for the target node corresponding to the particular garget can indicate which robots are compatible.

In some implementations, the initial feature representation for one or more of the target nodes can further include information on orientation constraints of the corresponding one or more targets. For example, for operating on a particular target (e.g., performing spot welding on the target location), a robot arm may need to be constrained in a specific orientation or in a specific range of orientations. The orientation constraint information for the target node corresponding to the particular target can indicate the constrained orientation or the range of constrained orientations.

Each edge in the graph connects a respective pair of nodes from the plurality of nodes. The graph includes edges between each robot node and each target node, edges between each robot node and each other robot node, and optionally edges between each robot node and each obstacle node. In some implementations, the graph does not include any edges between any two target nodes or between two obstacle nodes, neither does the graph include any edges between any obstacle node and any target node in the graph.

In some implementations, the graph data further includes an initial feature vector indicating edge features for each edge. The edge features of a particular edge can encode distance, relative positions, and/or relative orientations of the two nodes connected by the particular edge.

After generating the graph data from the state data, the system processes the graph data using a graph neural network to generate a graph output in step 530. The graph output includes a respective updated feature representation for each of the robot nodes. Optionally, the graph output includes respective updated feature representation for each of the robot nodes and/or each of the target nodes. In some implementations, the graph output further includes updated feature representations for the edges. The graph neural network includes one or more message passing layers, and for any given node, each message passing layer updates the feature representation of the node based only on feature representations for nodes that are connected to the node by an edge in the graph.

Next, in step 540, the system selects, based on the graph output, a respective action to be performed by each of the robots. In certain implementations, the system directly processes the graph output using a neural network to select actions for the respective robots. In certain other implementations, the system performs one or more planning iterations using the graph output to generate plan data, and selects the actions for the respective robots using the plan data.

FIG. 6 is a flow diagram of an example process for generating robot actions from state data with planning iterations. For convenience, the process 600 will be described as being performed by a system of one or more computers located in one or more locations. For example, the multi-robot and planning control system as shown in FIG. 4A, appropriately programmed in accordance with this specification, can perform the process 600.

The system controls a plurality of robots to cause the robots to perform a task by repeatedly performing the following operations.

First, the system performs a plurality of planning iterations starting from a current state of the environment to generate plan data. The plan data can include sequences of actions for the robots. The plan data can further statistics for the states of the environment associated with the sequences of actions. Each planning iteration includes steps 620 to 650.

In step 620, the system performs look-ahead iteration by traversing through states of the environment starting from the current state until a leaf state of the environment is reached.

In step 630, the system generates, from state data characterizing the leaf state, graph data representing a graph of the leaf state of the environment. The graph includes a plurality of nodes and a plurality of edges. The plurality of nodes includes a respective robot node for each of the robots and a respective target node for each of the target locations, and optionally a respective obstacle node for each of the target objects. The graph data includes a respective initial feature representation for each of the robot nodes, each of the target nodes, and optionally each of the obstacle nodes.

Each edge in the graph connects a respective pair of nodes from the plurality of nodes. The graph includes edges between each robot node and each target node, edges between each robot node and each other robot node, and optionally edges between each robot node and each obstacle node. In some implementations, the graph does not include any edges between any two target nodes or between two obstacle nodes, neither does the graph include any edges between any obstacle node and any target node in the graph.

In step 640, the system processes the graph data using a graph neural network to generate a graph output. The graph output includes a respective updated feature representation for each of the robot nodes. Optionally, the graph output includes respective updated feature representation for each of the robot nodes and/or each of the target nodes. The graph neural network includes one or more message passing layers, and for any given node, each message passing layer updates the feature representation of the node based only on feature representations for nodes that are connected to the node by an edge in the graph.

In step 650, the system updates plan data according to the graph output. The system can generate an update to the plan data, and update the plan data using the generated update. In generating the update, the system can generate a summary feature of the leaf state from the graph output, and process the summary feature using a value prediction neural network to predict a value score that represents a predicted value of being in the leaf state to successfully complete the task. Further, for each robot node, the system can process the updated feature representation for the robot node using a policy neural network to generate a policy output that defines a probability distribution over a set of possible actions to be performed by the corresponding robot node when the environment is in the leaf state.

After performing the planning iterations, in step 660, the system selects actions to be performed by the respective robots using the plan data. For example, the system can make the selection by first determining, from the sequences of actions in the plan data, a sequence of actions that has a maximum associated value, and then selecting the first action in the determined sequence of actions as the actual actions to be performed by the respective robots according to the current observation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method performed by one or more computers and for controlling a plurality of robots to cause the robots to move to a plurality of target locations in an environment, the method comprising repeatedly performing the following operations:

obtaining state data representing a current state of the environment;

generating, from the state data, graph data representing a graph of the current state of the environment, the graph comprising a plurality of nodes and a plurality of edges, wherein each edge connects a respective pair of nodes from the plurality of nodes, wherein the plurality of nodes comprises a respective robot node for each of the robots and a respective target node for each of the target locations, wherein the graph includes one or more edges between at least one of the robot nodes and at least one of the target nodes, and wherein the graph data comprises a respective initial feature representation for each of the robot nodes and for each of the target nodes;

processing the graph data using a graph neural network to generate a graph output that comprises a respective updated feature representation for each of the robot nodes;

selecting, based on the graph output, a respective action to be performed by each of the robots; and controlling at least one of the robots using the selected actions.

2. The method of claim 1, wherein the environment includes one or more obstacles, wherein the graph comprises a respective obstacle node for each of the one or more obstacles, and wherein the graph data comprises a respective initial feature representation for each of the obstacle nodes.

3. The method of claim 2, wherein the graph includes edges between each robot node and each obstacle node.

4. The method of claim 3, wherein the graph does not include any edges between any two obstacle nodes.

5. The method of claim 3, wherein the graph does not include any edges between any obstacle node and any target node in the graph.

6. The method of claim 1, wherein the graph includes edges between each robot node and each other robot node.

7. The method of claim 1, wherein the graph includes edges between each robot node and each target node.

8. The method of claim 1, wherein the graph does not include any edges between any two target nodes.

9. The method of claim 1, wherein the graph data comprises edge data representing the edges in the graph.

10. The method of claim 9, wherein the graph neural network includes one or more graph layers, each of the graph layers configured to update, for any given node, the feature representation for the given node based only on feature representations for nodes that are connected to the node by an edge in the graph.

11. The method of claim 1, wherein selecting the respective action to be performed by each of the robots comprises:
predicting the respective action by processing the graph output.

12. The method of claim 1, wherein selecting the respective action to be performed by each of the robots comprises:
performing one or more planning iterations using the graph output to generate plan data; and
selecting actions using the plan data.

13. One or more computer-readable storage media storing instructions that, when executed by one or more computers, cause the one or more computers to perform the operations of the respective method of claim 1.

14. A method performed by one or more computers and for controlling a plurality of robots to cause the robots to perform a task that involves moving to a plurality of target locations in an environment, the method comprising repeatedly performing the following operations:
performing a plurality of planning iterations starting from a current state of the environment to generate plan data, wherein performing each planning iteration comprises:
traversing through states of the environment starting from the current state until a leaf state of the environment is reached;
generating, from state data characterizing the leaf state, graph data representing a graph of the leaf state of the environment, the graph comprising a plurality of nodes and a plurality of edges, wherein each edge connects a respective pair of nodes from the plurality of nodes, wherein the plurality of nodes comprises a respective robot node for each of the robots and a respective target node for each of the target locations, wherein the graph includes one or more edges between at least one of the robot nodes and at least one of the target nodes, and wherein the graph data comprises a respective initial feature representation for each of the robot nodes and for each of the target nodes;
processing the graph data using a graph neural network to generate a graph output that comprises a respective updated feature representation for each of the robot nodes;
generating, from the graph output, an update to the plan data; and
updating the plan data using the generated update;
after performing the plan data, selecting an action using the plan data; and
controlling at least one of the robots using the selected actions.

15. The method of claim 14, wherein generating, from the graph output, an update to the plan data comprises:
generating a summary feature of the leaf state from the graph output; and
processing the summary feature using a value prediction neural network to predict a value score that represents a predicted value of being in the leaf state to successfully completing the task.

16. The method of claim 14, wherein generating, from the graph output, an update to the plan data comprises, for each robot node:
processing the updated feature representation for the robot node using a policy neural network to generate a policy output that defines a probability distribution over a set of possible actions to be performed by the corresponding robot node when the environment is in the leaf state.

17. The one or more computers of claim 14 comprising one or more storage devices storing instructions that when executed by the one or more computers, cause the one or more computers to perform the operations of claim 14.

18. A system comprising:
one or more computers; and
one or more storage devices storing instructions that when executed by the one or more computers, cause the one or more computers to perform the operations comprising:
obtaining state data representing a current state of the environment;
generating, from the state data, graph data representing a graph of the current state of the environment, the graph comprising a plurality of nodes and a plurality of edges, wherein each edge connects a respective pair of nodes from the plurality of nodes, wherein the plurality of nodes comprises a respective robot node for each of the robots and a respective target node for each of the target locations, wherein the graph includes one or more edges between at least one of the robot nodes and at least one of the target nodes, and wherein the graph data comprises a respective initial feature representation for each of the robot nodes and for each of the target nodes;
processing the graph data using a graph neural network to generate a graph output that comprises a respective updated feature representation for each of the robot nodes;
selecting, based on the graph output, a respective action to be performed by each of the robots; and
controlling at least one of the robots using the selected actions.

* * * * *